(12) United States Patent
Turmeau et al.

(10) Patent No.: US 8,950,339 B2
(45) Date of Patent: Feb. 10, 2015

(54) ENCODER DEVICE FOR USING A MAGNETIC SENSOR ARRANGEMENT AND BEARING UNIT COMPRISING THE SAME

(71) Applicants: Arnaud Turmeau, Tours (FR); Thierry Le Moigne, Reugny (FR)

(72) Inventors: Arnaud Turmeau, Tours (FR); Thierry Le Moigne, Reugny (FR)

(73) Assignee: Aktiebolaget SKF, Gothenburg (SE)

( * ) Notice: Subject to any disclaimer, the term of this patent is extended or adjusted under 35 U.S.C. 154(b) by 143 days.

(21) Appl. No.: 13/693,128

(22) Filed: Dec. 4, 2012

(65) Prior Publication Data

US 2013/0160669 A1    Jun. 27, 2013

(30) Foreign Application Priority Data

Dec. 22, 2011    (EP) .................................... 11290597

(51) Int. Cl.
| | |
|---|---|
| *G01P 3/488* | (2006.01) |
| *B61F 5/28* | (2006.01) |
| *G01B 7/30* | (2006.01) |
| *G01P 3/44* | (2006.01) |
| *G01D 5/14* | (2006.01) |
| *F16C 41/00* | (2006.01) |
| *B61F 15/20* | (2006.01) |

(52) U.S. Cl.
CPC ... *B61F 5/28* (2013.01); *G01B 7/30* (2013.01); *G01P 3/443* (2013.01); *G01D 5/145* (2013.01); *F16C 41/007* (2013.01); *G01P 3/488* (2013.01); *B61F 15/20* (2013.01); *F16C 2326/10* (2013.01)
USPC ....................................................... 105/218.1

(58) Field of Classification Search
CPC .......... G01P 3/443; G01P 3/487; G01P 3/488
USPC ....................................................... 105/218.1
See application file for complete search history.

(56) References Cited

U.S. PATENT DOCUMENTS

| | | | |
|---|---|---|---|
| 4,002,937 A | 1/1977 | Anson | |
| 4,795,278 A * | 1/1989 | Hayashi | ........................ 384/448 |
| 5,696,442 A | 12/1997 | Foster et al. | |
| 2004/0250619 A1* | 12/2004 | Sakamoto | ........................ 73/494 |
| 2010/0019761 A1* | 1/2010 | Ueno et al. | ............... 324/207.25 |

FOREIGN PATENT DOCUMENTS

| | | |
|---|---|---|
| EP | 1291660 A2 | 3/2003 |
| GB | 1591418 A | 6/1981 |

\* cited by examiner

*Primary Examiner* — Zachary Kuhfuss
(74) *Attorney, Agent, or Firm* — Bryan Peckjian; SKF USA Inc. Patent Dept.

(57) ABSTRACT

An encoder device for use in a magnetic sensor arrangement, comprising: a metallic ring having a set of clearances in a ferromagnetic material, wherein said clearances are arranged around a circumference of the metallic ring, wherein the metallic ring is configured to generate an oscillating magnetic induction in a nearby magnetic sensor upon rotation of the metallic ring, wherein the metallic ring is made of at least one flat and strip-like sheet metal material, two ends of which are joined to form a loop.

8 Claims, 4 Drawing Sheets

ENCODER DEVICE FOR USING A MAGNETIC SENSOR ARRANGEMENT AND BEARING UNIT COMPRISING THE SAME

FIELD OF THE INVENTION

The invention relates to encoder devices comprising magnetic or ferromagnetic phonic wheels or impulse wheels formed as a metallic ring configured to generate an oscillating signal in a magnetic sensor. The frequency of the sensor is proportional to the speed of rotation of the ring. Encoder devices of this type are used as rotary speed sensors in many fields of application, such as automotive technology and rail vehicles.

BACKGROUND OF THE INVENTION

Rotary speed sensors for rail vehicles such as a locomotive or a multiple unit are used to reliably and precisely determine the rotary speed of the wheels of an axle. This applies in particular to traction control, but also to wheel-slip protection. Rotary sensors are further used in registration, train control, door control, etc. Multiple rotary speed sensors may be found in various parts of the vehicle. In particular the rotary speed sensors used for traction control are used in extremely harsh operating conditions encountered by rail vehicles.

It has turned out that the principle of scanning a ferromagnetic measurement scale with a magnetic sensor is extremely robust and often does not fail even if a seal has failed and the pulse generator is covered with a layer of brake dust or other dirt.

Phonic wheels used as encoder devices of this type are usually machined from stainless steel with a DIN-867 teeth design and are, therefore, fairly expensive. Some cost-saving potentials have been achieved by integrating the phonic wheel with an end cap as used for clamping the inner ring of a railway bearing onto the axle, e.g., in the SKF Axletronic odometer for axle box front covers described under http://evolution.skf.com/zino.aspx?articleID=15221. A further bearing assembly with a metallic tooth ring is disclosed e.g., in U.S. Pat. No. 4,069,435.

The invention addresses the problems of simplifying the manufacture, maintenance and exchange of the encoder impulse wheel in a sensor arrangement, reducing the costs thereof and simplifying its adaptation to different sensor designs.

SUMMARY OF THE INVENTION

This object is achieved with a bearing unit having an encoder and an axle box including such an encoder device. A further aspect of the invention relates to a method for manufacturing the encoder device.

According to an essential aspect of the invention, the encoder device for the use in a magnetic sensor arrangement comprises a metallic ring with a set of clearances in a ferromagnetic material. The clearances are preferably homogeneously distributed around the circumference of the metallic ring and the clearances together with ferromagnetic parts of the metallic ring arranged between pairs of adjacent clearances generate an oscillating magnetic induction in a nearby magnetic sensor upon rotation of the metallic ring. It is proposed that the metallic ring is made of a flat and strip-like sheet metal material, the ends of which are joined to form a loop. Instead of machining the encoder wheel from a solid piece of metal, the required shape can simply be stamped out of the sheet metal, which is then bent and closed to a loop so as to form a ring or a wheel. This does not only save costs, but also simplifies the replacement and maintenance of the metallic ring, and the pattern and the spacing of the clearances may be adapted in a simple way to the sensor design.

In a preferable embodiment, a prefabricated metal tape with clearances may be used to form the metallic ring for the encoder device.

In an advantageous embodiment of the invention, the encoder device further comprises means for connecting the end portions of the strip-like sheet-metal material in a connecting portion of the metallic ring. The means may, e.g., be bolts or clamping means such as slits, or other connecting means such as welding points or the like.

The end portions of the strip-like sheet metal material may either be overlapping in the connecting portion and simultaneously fixed to a support ring around which the sheet metal strip is wound, or may alternatively be bent radially inwardly and clamped by a clamping slit in the connecting portion of the metallic ring.

Further, it is possible that the length of the strip is substantially identical to the circumference of the support ring such that the ends of the strip abut upon each other and/or face each other with a minute slit which is small enough not to essentially disturb the homogeneous distribution of the clearances around the circumferences of the metallic ring. In this connection it is to be noted that the distribution of the clearances around the circumference of the metallic ring is preferably homogeneous. However, other types of distributions enabling an absolute detection of the rotary position would be possible in principle.

Further, a reliable mounting of the metallic ring on a support ring may be achieved when the metallic ring comprises holes for bolting the metallic ring onto the support ring.

A further aspect of the invention relates to an encoder device comprising a support ring with a substantially cylindrical outer surface, wherein the strip-like metal material forming the metal ring is wound around the outer surface of the support ring and fixed thereon. Due to the supporting ring, a thin sheet metal material may be used for the encoder/phonic/impulse wheel, the ring-shape of which will be stabilized by the support ring.

A cost-saving production of the strip or tape of sheet metal material can be achieved when the clearances are stamped out of this strip.

In particular for heavy duty applications, it is preferable when the clearances have a substantially rectangular shape and are surrounded by the ferromagnetic material. The metallic borders of the clearances protect the latter from wear and stabilize the metallic parts arranged between the clearances in particular as compared to an alternative embodiment where the clearances are open on one side and defined between two tabs protruding from a lateral belt of the strip such that a comb-like structure is formed.

A further aspect of the invention relates to a bearing unit with an inner ring and an outer ring rotating relative to one another, and a magnetic sensor disposed nearby the portion of the metallic ring being provided with the clearances in order to measure the oscillating magnetic induction caused by the rotation of the latter. The metallic ring is connected to a first one of the rings and the magnetic sensor is connected to a second one of the rings, wherein the second ring is preferably the non-rotating ring of the application, which simplifies the readout.

Further, it is preferable that an end plate of the bearing unit used for clamping a first one of the metallic rings is used as a support ring as mentioned above having an essentially cylindrical outer surface on which the strip-like metal material forming the metal ring is wound and fixed. Since the metal ring is already ferromagnetic, the end plate may be manufactured from non-magnetic materials.

Further, it is proposed to provide an axlebox for railway vehicles including a bearing unit as described above, and an end cover, wherein the magnetic sensor is mounted in the end cover.

A further aspect of the invention relates to a method for manufacturing an encoder device for use in a magnetic sensor arrangement, comprising a metallic ring as described above. It is proposed that the metallic ring is made of at least one flat and strip-like sheet metal material, two ends of which are joined to form a loop.

Preferably, the flat and strip-like sheet metal material is cut from a prefabricated roll of metal tape with the clearances preformed therein at equal distances, preferably by stamping.

BRIEF DESCRIPTION OF THE FIGURES

Further advantages and features of the invention will be described in the following description of the specific embodiments of the invention, which should by no means be construed as limiting its scope, but rather to enable this application in a specific field and give the skilled reader incentives to adapt it to other fields of application envisaged.

DETAILED DESCRIPTION OF THE INVENTION

Figure 1:
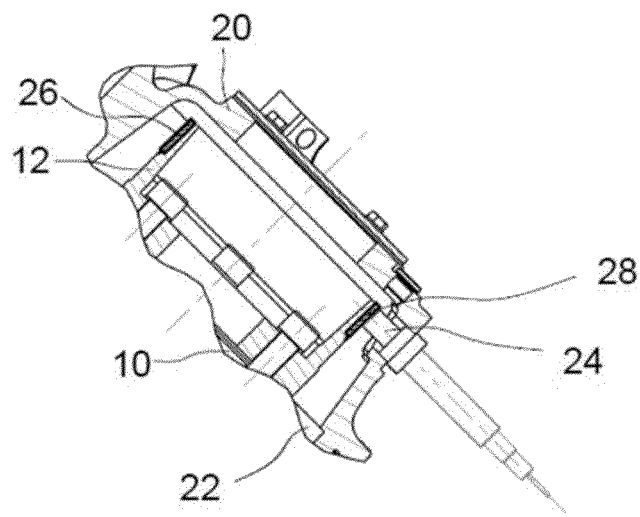
FIG. 1 shows a cross-sectional view of a railway axlebox with a bearing unit equipped with an encoder device according to the invention.

FIG. 1 is a schematic view of a bearing 10 with an end plate 12 serving as a support plate for a phonic wheel/impulse wheel for a magnetic anti-skidding sensor arrangement for detecting the speed of rotation of an axle (not shown), on which an inner ring (not shown) of the bearing is mounted. The end plate 12 is bolted on the end of the axle and clamps the bearing 10, which is formed as a double-row angular contact roller bearing with cylindrical rollers arranged between the inner ring and an outer ring of the bearing 10.

An end cover 20 is connected with the outer ring via an axlebox housing 22. A magnetic sensor 24 is mounted in the end cover 20, so as to be oriented radially inward such that its sensing surface is oriented parallel and in proximity to the radially outer surface of a metallic ring 26 arranged on the radially outer surface of the end plate 12 with a small air gap 28 between the sensor 24 and the ring 26. The ring 26 is the encoder ring or phonic wheel of the magnetic anti-skidding sensor arrangement which generates an oscillating inductance which can be measured by the magnetic sensor 24 and the frequency of which is proportional to the speed of rotation of the axle 14. The sensor 24 is read out via a signalling connection 30 by a control unit (not shown).

Figure 2:
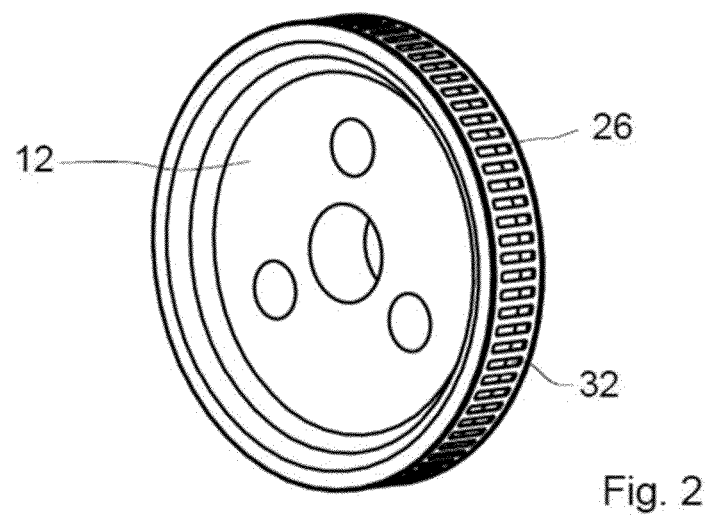
FIG. 2 is an end cap of the encoder device of FIG. 1 with a metallic ring formed of a strip-like sheet metal material wound around the end plate.

FIG. 2 illustrates the end plate 12 with the metallic ring 26 detached from the bearing unit. The metallic ring 26 is provided with many basically rectangular clearances 32 distributed at equal distances around the circumference of the ring 26. As will be explained later, the metallic ring 26 is actually made of a band-like strip of sheet metal from which the clearances are punched out.

The clearances 32 have a longitudinal direction oriented in the axial direction of the end plate 12 and are surrounded by metallic ligaments or bridges with the overall shape of a ladder.

Figure 3A:
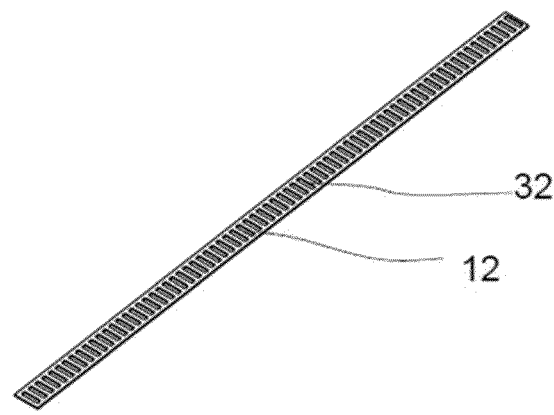
FIGS. 3A and 3B are schematic illustrations of the manufacturing method of the end plate according to FIG. 2.
Figure 3B:
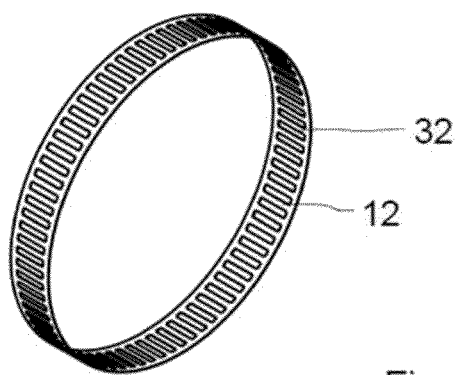

FIGS. 3A and 3B show schematically how the metallic ring 26 is manufactured. First, a piece with a length slightly longer than the circumference of the radially outer surface of the end plate 12 is cut off from a prefabricated roll of metal tape with the clearances 32 punched out, resulting in a strip-like member as shown in FIG. 3A. The typical diameter of the end plate 12 for railway applications is around 200 mm, the length of the metal strip is around 650 mm. The strip is then closed to a loop and wound around the end plate 12 by joining its ends together and is then fixed on the radially outer surface of the end plate 12 by any of the means illustrated in FIGS. 4A to 4E below.

The width of the strip is around 20 mm, and the width of the clearances 32 (in the circumferential direction) is around 5-8 mm.

Figure 4A:
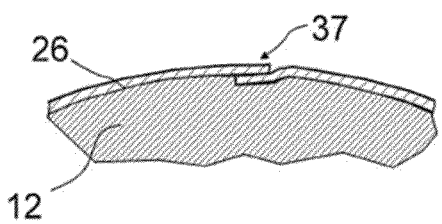
FIGS. 4A-4F illustrate different alternative possibilities of the fixing the strip-like metal material tape on the radially outer surface of a support ring.

FIG. 4A shows a first possibility for closing the metal strip illustrated in FIG. 3 by connecting its end portions in a connecting portion 37 so as to form the metallic ring 26. In the embodiment of FIG. 4A, the end plate 12 has a radially outer surface which is not perfectly cylindrical but is rather provided with a slight recess, where the radially outer surface is recessed with respect to the perfectly cylindrical shape by an amount corresponding to the thickness of the metal sheet. The end portions of the strip are arranged so as to be overlapping, and are welded together by a welding point. The thickness of the sheet metal used to fabricate the strip and the depth of the recess in the end plate 12 is preferably around 0.8-1 mm. The two end portions of the strip may be fixed to the end plate 12, which serves as the support ring, by two lateral welding points or by bolts 34 as illustrated in FIGS. 4B and 4C.

Figure 4B:
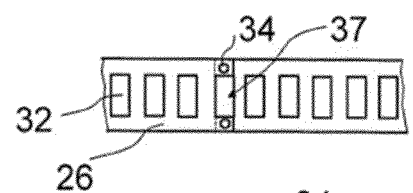

In the embodiment of FIG. 4B, the strip is cut on both of its ends within a clearance, preferably such that the major part of the lateral metallic portions delimiting the clearances 32 in which the strip is cut remain connected to the strip. These lateral portions are overlapping to an extent that it is possible to bolt them together onto the end plate 12, as illustrated in FIG. 4B.

Figure 4C:
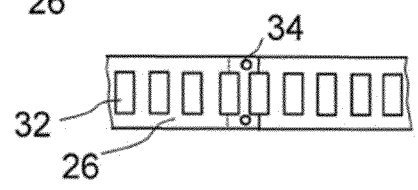

FIG. 4C shows an alternative embodiment, wherein the bolts 34 are arranged on the lateral belts of the punched metal strip in a portion between two neighbouring clearances 32, i.e. on a centre line of one of the ligaments separating the clearances.

The circumference of the end plate 12 or, more precisely, the circumference of the metallic ring 26, which corresponds to the circumference of a circle with a radius corresponding to the radius of the end plate 12 plus the thickness of the sheet metal, is a multiple of the pitch distance of the clearances 32 punched in the strip, such that the clearances 32 in the metallic ring 26 as mounted on the end plate 12 are homogenously distributed around the circumference of the metallic ring 26 without any discontinuities at the connecting portion of the metallic ring, where the end parts of the strip are overlapping.

Figure 4D:
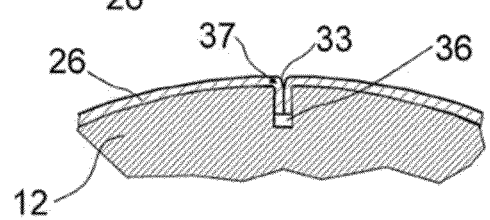

FIG. 4D shows and alternative possibility for mounting the metallic ring 26 onto the end plate 12 to form a phonic wheel. The end portions of the strip are bent radially inward in a bending point 33 and fitted into the clamping notch 36 provided in the radially outer surface of the end plate 12. The connection of the strip with the end plate 12 may be enhanced within the notch 36 and/or on the outer surface of the end plate by means of adhesive bonds, resin or the like, wherein it is even possible to fill the clearances 32 with non-ferromagnetic materials such as polymers.

Figure 4E:
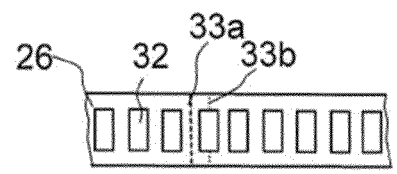

FIG. 4E shows two possibilities for the choice of the bending points 33 for the fixation according to FIG. 4D, and/or for the choice of the centre of the overlapping portion in the alternative of FIG. 4B. It is preferred that these points are either in the centre of the one of the clearances 32 (dotted line, reference number 33b), or between two adjacent clearances (dashed line, reference number 33a) for symmetry reasons.

It is further possible to have the ends of the strip abutting to one another without any overlapping portion, and to fix the strip on the end plate 12 by other means, e.g. adhesive bonds.

Figure 4F:
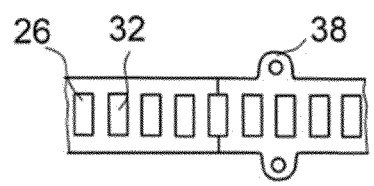

Further alternative or complementing possibility for fixing the strip on the end plate 12 is to provide tabs or ears 38 with through holes on one or both sides of the strip through which the strip could then be bolted onto the radially outer cylindrical surface of the end plate 12 or of another support plate. This is illustrated in FIG. 4F.

Figure 5:
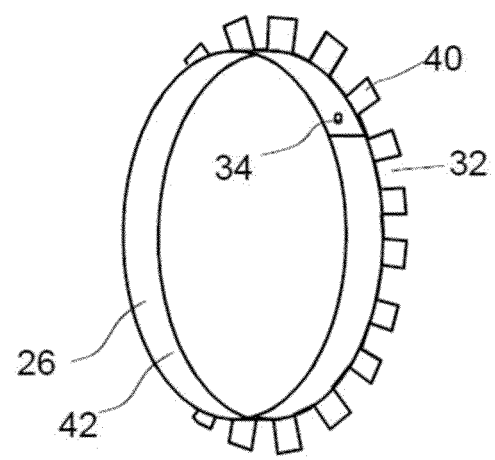
FIG. 5 illustrates an alternative embodiment wherein the clearances in the metal tape are open on one side, and a corresponding method for manufacturing an encoder device for an axially oriented magnetic sensor.

FIG. 5 shows a further alternative embodiment of the invention with a metallic ring 26 configured to generate signals for a magnetic sensor with an axial orientation/sensing direction. The strip is provided with equidistantly spaced tabs 40 defining clearances 32 between them which are surrounded by the ferromagnetic metal material of the sheet metal strip on three sides and open on one side. For manufacturing the ring 26, the tabs are bent by 90° and then the belt 42 connecting the tabs 40 is wound around a support plate with a cylindrical outer surface and fixed thereon by any of the means illustrated in FIGS. 4A to 4F.

The invention claimed is:

1. An encoder device for use in a magnetic sensor arrangement, the encoder device comprising:
a metallic ring having a set of clearances in a ferromagnetic material, the set of clearances being arranged around a circumference of the metallic ring, the metallic ring configured to generate an oscillating magnetic induction in a magnetic sensor upon rotation of the metallic ring, the metallic ring made of at least one flat and strip-like sheet metal material, two ends portions of which are joined to form a loop, the two end portions overlapping in a connecting portion of the metallic ring, and
wherein the two ends portions are bent radially inward and clamped by a clamping slit in the connecting portion.

2. The encoder device according to claim 1, wherein the metallic ring provides holes for bolting the metallic ring onto a support ring.

3. The encoder device according to claim 1, further comprising a support ring with an essentially cylindrical outer surface, wherein the strip-like metal material forming the metal ring is wound around the essentially cylindrical outer surface of the support ring and fixed thereon.

4. The encoder device according to claim 1, wherein the set of clearances are stamped out of a strip of the strip-like sheet metal material.

5. The encoder device according to claim 1, wherein the set of clearances have a substantially rectangular shape and are surrounded by the ferromagnetic material.

6. A bearing unit comprising:
at least two rings rotating relative to one another;
the encoder device according to claim 1; and
the magnetic sensor,
wherein the metallic ring is connected to a first one of the at least two rings and the magnetic sensor is connected to a second one of the at least two rings so as to measure the oscillating magnetic induction generated upon rotation of the metallic ring.

7. The bearing unit according to claim 6, further comprising an end plate for clamping the first one of the at least two rings, wherein the end plate is used as a support ring with a cylindrical outer surface on which the strip-like sheet metal material forming the metallic ring is wound and fixed.

8. An axlebox for railway vehicles comprising:
a bearing unit having at least two rings configured to rotate relative to one another, the encoder device according to claim 1, and the magnetic sensor,
the metallic ring connected to a first one of the at least two rings and the magnetic sensor connected to a second one of the at least two rings so as to measure the oscillating magnetic induction generated upon rotation of the metallic ring; and
an end cover,
wherein the magnetic sensor is mounted within the end cover.

* * * * *